United States Patent [19]

Benest

[11] Patent Number: 5,174,596
[45] Date of Patent: Dec. 29, 1992

[54] CATAMARAN BOAT TRAILER

[76] Inventor: Roger S. Benest, Manor House Farm Rue de Bas, St Lawrence, Jersey, Great Britain

[21] Appl. No.: 651,226

[22] PCT Filed: Aug. 7, 1989

[86] PCT No.: PCT/GB89/00901
§ 371 Date: Mar. 14, 1991
§ 102(e) Date: Mar. 14, 1991

[87] PCT Pub. No.: WO90/01432
PCT Pub. Date: Feb. 22, 1990

[30] Foreign Application Priority Data

Aug. 6, 1988 [GB] United Kingdom ............... 8818750
Oct. 14, 1988 [GB] United Kingdom ............... 8824125

[51] Int. Cl.⁵ .................................................. B60P 3/10
[52] U.S. Cl. .................................... 280/414.1; 414/483
[58] Field of Search ............ 280/414.1, 414.3, 47.331; 414/476, 482, 483; 114/344

[56] References Cited

U.S. PATENT DOCUMENTS

| | | | |
|---|---|---|---|
| 2,748,962 | 6/1956 | Murray | 280/414.1 X |
| 2,905,481 | 9/1959 | Schramm | 280/414.1 X |
| 2,919,825 | 1/1960 | Hornsby | 414/483 X |
| 3,032,218 | 5/1962 | Grigonis | 414/476 |
| 3,604,579 | 9/1971 | Jenkins | 414/482 |
| 4,286,800 | 9/1981 | Lomas | 280/414.1 |
| 4,589,814 | 5/1986 | Cates | 280/414.1 X |
| 4,673,328 | 6/1987 | Shiels | 414/482 X |

Primary Examiner—David M. Mitchell
Assistant Examiner—Kevin Hurley

[57] ABSTRACT

A trailer for catamarans, which can also function as a launch trolley, uses a lever mechanism to actuate a pivotally mounted lifting arm (20) which engages the front cross beam (44) of the catamaran. The reaction thrust is transmitted through the frame to a second lifting arm (22) engaging the rear cross beam (42), whereby the weight of the whole boat is transferred to the trailer frame (14). The lever mechanism is self-locking in its raised position. A roller on the actuating lever provides a moving pivot point whereby a cam-like action is obtained.

8 Claims, 2 Drawing Sheets

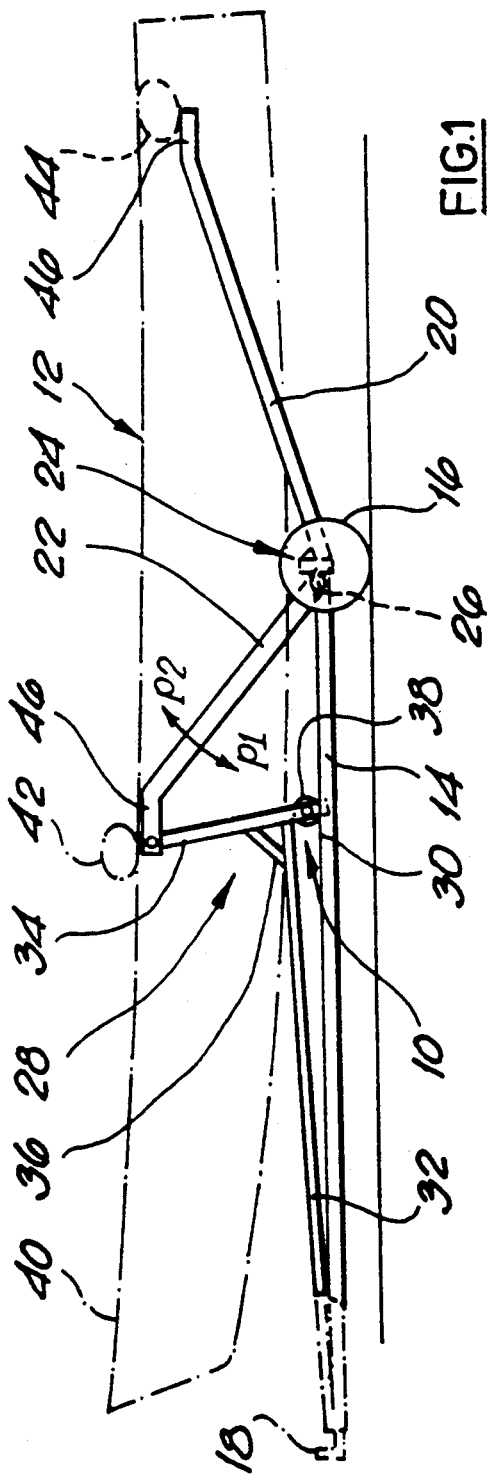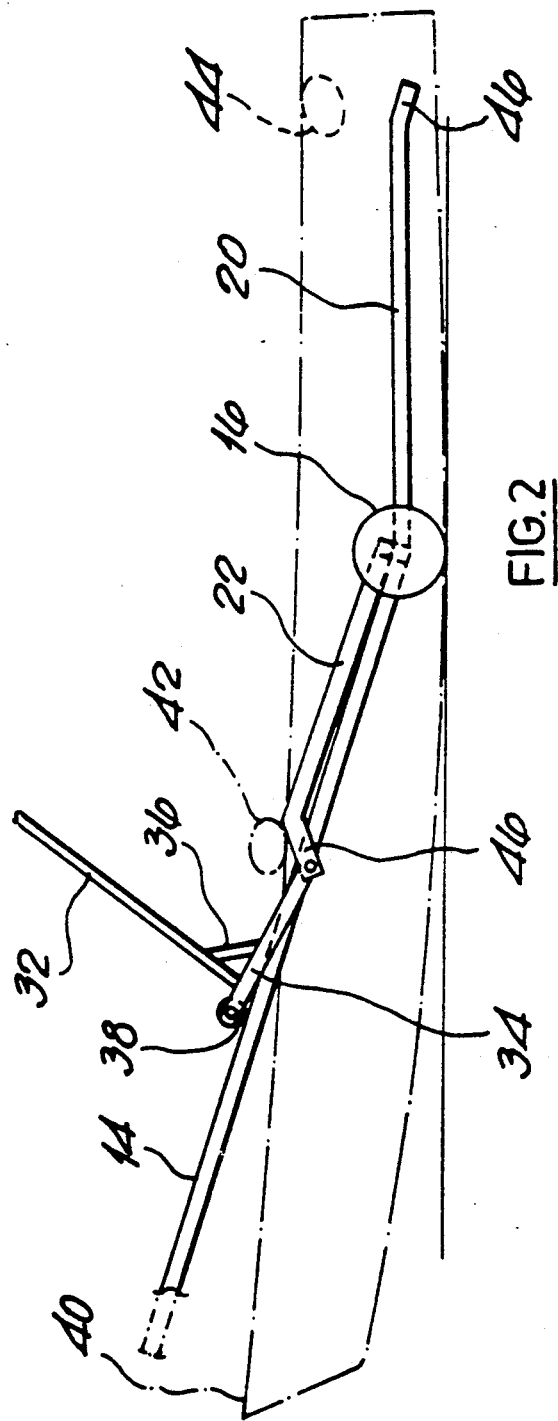

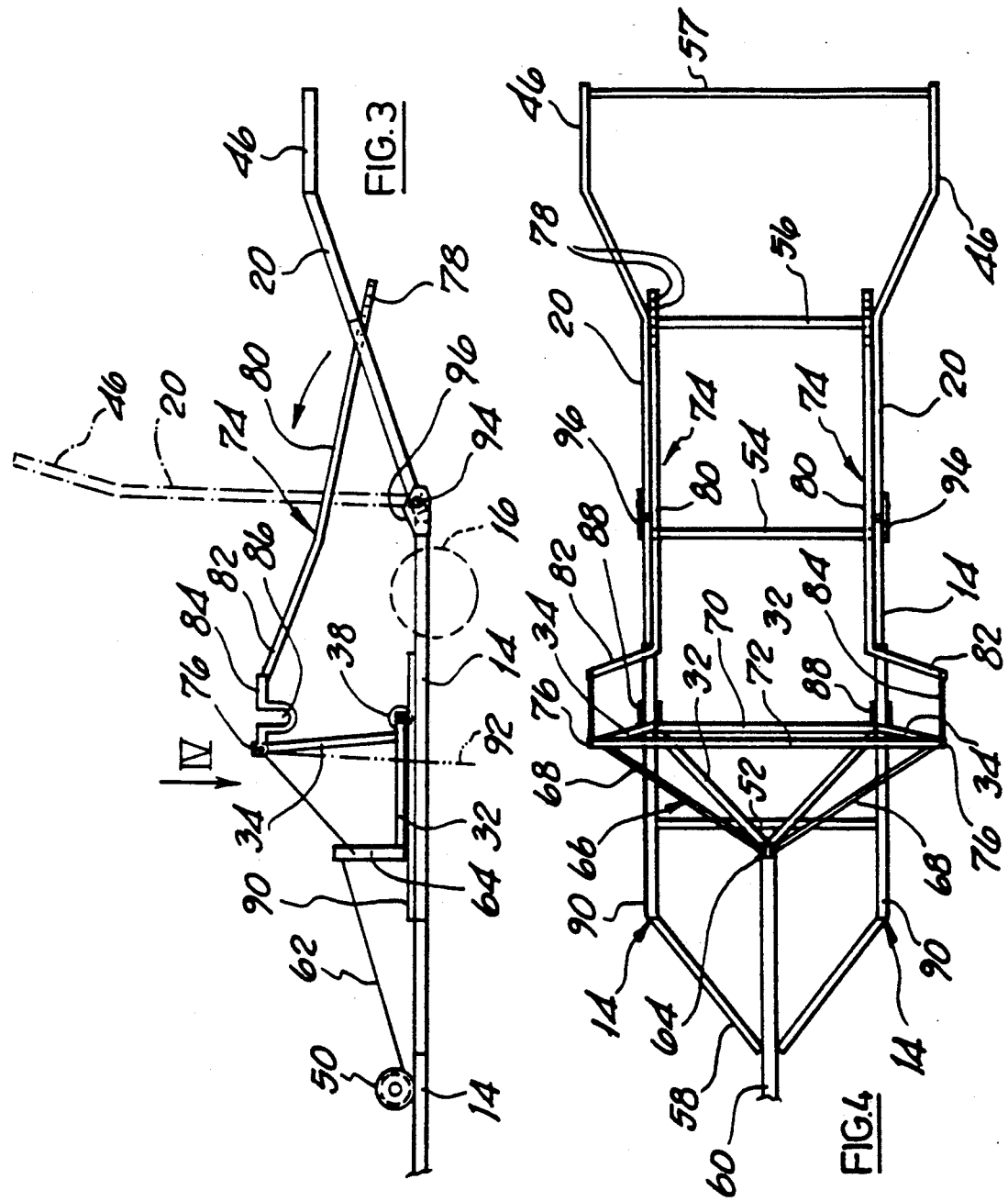

CATAMARAN BOAT TRAILER

This invention relates to trailers and to methods of loading and unloading articles thereon. The invention is particularly applicable to trailers for road transport of boats such as catamarans and other articles capable of being lifting by application of upthrust at two spaced locations.

BACKGROUND OF THE INVENTION

Conventional trailers for catamarans and other boats require two or more men to lift the boat onto the trailer, and a separate launch trolley to enable the boat to be rolled into the water to a point at which it can be floated off the trailer.

Accordingly, there is a considerable requirement for improvements and simplifications in relation to trailers and trolleys for towing and launching boats such as catamarans, whereby the labour and/or time and/or effort involved in loading and unloading the boat and/or in launching and recovering same are reduced in one way or another.

An object of the present invention is to provide a trailer, and a method of using same offering improvements in relation to one or more of these matters, or generally.

SUMMARY OF THE INVENTION

According to the invention there is provided a trailer, and a method of using same, as defined in the accompanying claims.

In a preferred embodiment there is provided a trailer suitable for road transport of boats such as catamarans and other articles capable of being lifted by application of upthrust at two spaced locations. The trailer comprises a trailer frame having towing means such as a hook for connection to a towing vehicle. First and second lifting members are mounted on the frame to apply upthrust to lift and lower a boat or the like article thereon, the upthrust being applied at spaced locations on the article. The first lifting member has means to define its position relative to the trailer frame for lifting purposes. The second lifting member is pivotally or otherwise movably mounted on the trailer frame and thrust means is connected between the trailer frame and the second lifting member to pivot the latter in the lifting direction, and to apply a corresponding reaction thrust to the trailer frame.

In the preferred embodiment, a pivotally mounted first lifting member is provided for engagement with the article to be lifted and transported, and thrust means is provided to pivot the second lifting member in the lifting direction and to apply a corresponding reaction thrust therefrom to the first lifting member, this reaction thrust being likewise in the lifting direction, being applied to the assembly on the opposite side of the pivot provided by the ground wheels.

In the preferred embodiment the thrust means comprises a lever mechanism. The lever mechanism has roller means to apply the reaction thrust to the trailer frame. The lever mechanism is in the form of a stiff or rigid lever structure carrying the roller means and pivotally connected to the second arm. The lever mechanism is arranged to be self-locking by going over-center so that the assembly remains in its boat-raised position until positively lowered. The lever mechanism provides a hand lever for manual operation. A winch may be provided, connected to the lever mechanism, to provide an alternative means of actuation.

In another preferred embodiment the first lifting member is provided by a rearward extension of the trailer frame, the rearward extension being rigid with the frame and extending upwardly therefrom. In this manner, reaction thrust from the thrust means, applied to the trailer frame on one side of the pivot provided by the trailer wheels/axle assembly, is transmitted as an upthrust to the second lifting member, which is located on the rearward side of the wheel/axle assembly. In another embodiment, the first lifting member is pivotally mounted and provided with stop means to limit its pivotal movement in the downward direction, whereby it functions in the above-described manner and can be pivoted upwards to a retracted transport position if desired.

There is described below a trailer which provides both the features of a one-man operated boat trailer and a launching trolley. The trailer has the form of a chassis which is capable of being lowered or collapsing to facilitate its positioning under a boat. The front and rear lifting member or mountings are positioned under the cross beams of the catamaran by suitable manipulation of the lever mechanism and the tow hitch. To lift the boat into the trailing position, the operator simply pulls down a lever which acts through an associated roller, to raise the front lifting member and thereby transfer the weight of the boat onto the trailer.

BRIEF DESCRIPTION OF THE DRAWINGS

FIG. 1 shows a side elevation view of a trailer, with an associated catamaran indicated in broken lines, the trailer being shown in its boat-lifted configuration;

FIG. 2 shows, in a view similar to FIG. 1, the assembly of FIG. 1 with the trailer in its boat-lowered configuration; and FIG. 3, in a view similar to FIG. 1, shows a second embodiment incorporating design modifications and showing a pivotally mounted rear lifting member and an associated tie rod; and FIG. 4 shows a plan view of the trailer of FIG. 3 as viewed in the direction of arrow IV.

DETAILED DESCRIPTION OF THE PREFERRED EMBODIMENT

As shown in FIGS. 1 and 2 of the drawings, a trailer 10 suitable for road transport of boats such as catamarans 12 comprises a trailer frame 14 mounted on ground wheels 16, and having towing means indicated diagrammatically at 18, in the form of a hook or the like for connection to a towing vehicle, at the forward end of the frame 14, which may be in the form of a draw bar.

First and second lifting members 20, 22 respectively are mounted on frame 14 to apply upthrust to lift and lower a boat or the like, at spaced locations on the boat.

First lifting member 20 has means to define its position relative to trailer frame 14 for lifting purposes. In this embodiment such means is provided by fixing lifting member 20, by means of a welded assembly 24, at the indicated angle with respect to frame 14. In this way, lifting member 20 forms a rigid extension of the frame for lifting purposes.

Second lifting member 22 is however provided with a pivotal mounting 26 by means of assembly 24 so that the lifting member can pivot in the direction indicated by double-ended arrow P1–P2.

Thrust means 28 is connected between trailer frame 14 and second lifting member 22 to pivot the latter in the lifting direction P2, and to transfer a corresponding reaction thrust to the trailer frame 14.

Thrust means 28 comprises a lever mechanism consisting of a stiff or rigid lever structure 30 comprising lever arms 32, 34 disposed at somewhat less than a right angle and stiffened by a brace 36. The structure 30 has, at its apex, a roller 38 rotatably mounted to apply the reaction thrust to the trailer frame 14. Roller 38 is mounted so as to run freely on a trackway (not shown) on the upper side of frame 14.

FIG. 1 shows the lever mechanism of thrust means 28 in its actuated position in which second lifting member 22 is fully raised. In this position, the lever mechanism is locked by virtue of the over-center position of the lever mechanism and the attitude of lever arm 34 with respect to the vertical. In order to release the lever mechanism, it is necessary for the user to forceably raise lever arm 32, thereby bringing roller 38 past the dead center position. Lever 32 provides a handle lever for manual operation of the mechanism.

In FIGS. 1 and 2, the twin hulls of catamaran 12 are indicated at 40 and the fore and aft cross-beams, linking the hulls, at 42 and 44. These cross-beams serve as the lifting locations for the application of upthrust from the first and second lifting members 20, 22. As shown, the lifting members have end portions 46, 48 to engage the cross-beams. Though not shown in FIGS. 1 and 2, lifting members 20, 22 are each provided at laterally spaced locations to provide upthrust on the cross-beams at corresponding spaced locations so that the catamaran is lifted without any tendency to tip laterally. Thrust means 28 applies its thrust equally to the two sides of second lifting member 22. First lifting member 20 is similarly constructed and arranged in this respect.

In use, FIG. 1 shows the trailer 10 with a catamaran 12 mounted thereon. In this assembled condition, the catamaran can be transported by road in the usual manner. Of course, though it is not indicated in FIG. 1 which is somewhat diagrammatic in this respect, a suitable resilient suspension can be provided for the road wheels 16 whereby cushioning of dynamic loadings applied to the trailer frame during road transport can be provided.

When the user arrives with the trailer and catamaran in the FIG. 1 configuration and wishes to launch the catamaran, the procedure for launching is as follows.

Having detached the assembly from the towing vehicle, the user can manipulate the assembly manually from the draw bar end of frame 14 so that the trailer and boat combination descends the sloping beach and enters the water. When a desired depth of water has been reached, it is merely necessary to release the lever mechanism 32, 34 in order to release the trolley from the boat. This is achieved simply by manually grasping lever 32 and raising same. Roller 38 rolls rearwards (towards hook 18), passes the dead center position, and lever 34 then allows member 46, which is supporting cross-beam 42, to descend. This action releases the reaction thrust from trailer frame 14. Accordingly, the upthrust, hitherto applied at 46 to cross-beam 44 is likewise released, and the boat can float free.

FIG. 2 shows the trailer in its boat-released configuration with lever member 32 raised and first lifting member 20 completely released from its cross-beam 44.

Loading the catamaran onto the trailer is performed by reversing the above-described operations.

DETAILED DESCRIPTION OF THE FIRST ALTERNATIVE EMBODIMENT

Turning now to the embodiment of FIGS. 3 and 4, it is to be noted first that parts of the trailer corresponding closely with parts in the embodiment of FIGS. 1 and 2 have been given the same reference numerals as in that embodiment.

It is also to be noted that in FIG. 4 there are certain differences from FIG. 3 arising from the somewhat diagrammatic and illustrative nature of FIG. 4. These differences are of no particular significance.

The major differences as between this second embodiment and the first embodiment lie in the provision in the second embodiment of a winch 50 for actuation of the boat loading/unloading mechanism. This leads to certain consequential modifications in the arrangement of the lever mechanism. Also, the second lifting member is modified, being in the form of an adjustable tie-rod assembly connected to the first lifting member. These details will now be described.

Frame 14 is in the form of a generally rectangular structure having cross-braces 52, 54, 56, the usual tapering forward portion 58 and an associated draw bar 60 on which winch 50 is mounted. The winch is connected by a cable 62 to an upstanding bracket 64 on lever 32.

FIG. 4 shows the structure of the lever assembly 32, 34. As can be seen, third forms part of a stiff or rigid 3-dimensional pyramidal structure 66 of which levers 32 define two of the converging edges and a pair of corresponding tie members 68 define the other two edges, all four being joined to bracket 64, and the base being stiffened by cross braces 70, 72. The entire structure is slidable on draw bar 60 to actuate the boat mounting mechanism and (as will be described later) to move the first lifting member 20 to its transport position shown in FIG. 3.

As can also be seen in FIG. 4, the upstanding lever members 34 extend somewhat outwardly laterally of the frame 14 so as to space further apart for stability the locations at which the upthrust is applied to the catamaran to be loaded thereon.

In this embodiment, the second lifting member 22 of the preceding embodiment is constituted by a pair of tie members 74 which are pivotally connected at 76 to the upstanding lever members 34. At their rear ends, the tie members are adjustably connected to first lifting member 20 by means of a series of apertures 78 and corresponding connection bolts (not shown). FIG. 4 shows the plan view profile of the tie members 74. They have a linear rear portion 80 extending alongside frame 14, followed by an outwardly and upwardly cranked portion 82 and an end portion 84 formed with a generally U-shaped recess 86 to receive a corresponding-shaped structure on the catamaran and to located same in the fore-aft direction. In use, tie members 74 are largely in tension under the load applied to end portions 84 close to pivot 76.

Rollers 38 (not shown in FIG. 4) are journalled in brackets 88 and run in a channel-section track 90 mounted on frame 14. FIG. 3 clearly shows the over-centre boat-mounted position of the assembly with respect to the vertical line 92 through pivot 76.

In this embodiment, the first lifting member 20 is pivotally mounted at 94 on brackets 96 at the rear end of frame 14. Bolts (not shown) through the brackets limit downward (clockwise pivotal) movement of the lifting member, for lifting purposes, while these bolts are removable to enable the lifting member to be raised to the transport position shown in dotted lines in FIG. 3.

In use, this embodiment functions in substantially the same manner as the embodiment of FIGS. 1 and 2. The winch enables more progressive actuation of the mechanism in both directions. From the boat-loaded over-center position shown in FIGS. 3 and 4, it is necessary for the operator to slacken cable 62 a little and to raise levers 32 so that levers 34 are slightly past the vertical 92, after which further slackening of the cable will enable the boat to be progressively lowered.

For transport purposes, after the trailer has been removed from the boat, winch 50 can be caused to draw forward the entire assembly of pyramidal structure 66 and tie members 74 plus first lifting members 20 until the latter reach the raised and retracted travelling position shown in FIG. 3.

Interestingly, the above embodiments provide a trailer for the road transport of boats such as catamarans which enables a single operator to both launch and recover a boat, and to hitch same to a transport vehicle for road transport. The trailer incorporates its own lifting mechanism enabling the weight of the boat to be transferred to and from the trailer by mere manual manipulation in a straightforward manner, and rapidly. The trailer structure is simple and relatively inexpensive to manufacture. It meets a long felt need for a straightforward means for permitting these functions to be carried out.

DETAILED DESCRIPTION OF OTHER VARIATIONS OF THE PREFERRED EMBODIMENTS

Amongst other modifications which could be made in the above embodiments while remaining within the scope of the invention are the following. Firstly, the second lifting member 22, 74 need not be pivotally mounted. For example, even a cable connection would probably be sufficient for the purpose. Secondly, for certain applications it might be desired not to actually support the boat, or other article to be transported, on the first and second lifting members throughout. These could be used just initially to raise the boat, which could then be lowered onto and supported on (for example) more extensive and loadspreading supports provided on the trailer, for transport. As an alternative to the lever mechanism for actuating the second lifting member, it might be possible to provide (for example in the embodiment of FIG. 1) a hand-pumped hydraulic ram to actuate lifting member 22 and having valve means or a supplemental mechanical prop to lock the assembly in the boat-transport position.

We claim:

1. A trailer (10) suitable for road transport of boats (12) capable of being lifted by application so upthrust at two spaced locations, the trailer comprising:
    a) a trailer frame (14) having towing means including a hook (18) for connection to a towing vehicle;
    b) a first (20) and second (22) lifting means mounted on said frame to apply upthrust to lift and lower a boat thereon at spaced locations on the boat;
    c) said first lifting means (20) having means to define its position relative to said trailer frame for lifting purposes;
    d) said second lifting means (22) being movably mounted (26) on said trailer frame (14); and
    e) thrust means (28) connected between said trailer frame and said second lifting means (22) to move the latter in the lifting direction (P2) and to apply a corresponding reaction thrust to said trailer frame;
    f) said first (20) and second (22) lifting means each providing structure (46) to apply lifting thrust to a boat to be lifted, and ground engageable wheel means (6) to support said trailer frame (14), said lifting thrust being applied to a boat to be lifted at laterally spaced positions thereon; said combination further including;
    g) said means defining the said position of said first lifting means (20) relative to said trailer frame (14) for lifting purposes providing a fixed position thereof relative to the trailer frame, said fixed position corresponding to the raised position of a boat to be lifted when said trailer frame is in its normal transport position (FIG. 1), and said fixed position corresponding to the lowered position of a boat to be lifted when said trailer frame is raised (FIG. 2);
    h) said thrust means (28) comprising a cam mechanism (32, 38) acting between said trailer frame (14) in said second lifting means (22);
    i) an operating lever (32) for said cam mechanism (34, 38) for lifting a boat to be transported by a double lever action using both said lever (32) of said cam mechanism and said trailer frame (14) acting as a lever about said ground engageable wheel means (16);
    j) said structure (46) of said second lifting means (22) comprising a rigid continuation (20) of said trailer frame (14).

2. The trailer of claim 1 wherein said continuation (2) of said trailer frame (14) extending by (as seen in side elevation) generally upwardly and rearwardly from said ground engageable wheel means (16) to provide a lever arm for lifting purposes, said trailer frame having laterally spaced apart fore/aft extending side frame members, said continuation (2) of said frame providing corresponding laterally spaced lever arms at each side of the frame linked by an end cross member (57).

3. The trailer of claim 2 further including tie means (74) connected to said continuation (20) of said trailer frame (14) to assist the supporting of loads applied to said continuation.

4. The trailer of claim 3 wherein said continuation (20) of said frame (14) is pivotable upwardly to a retracted/raised transport position.

5. A trailer (10) suitable for road transport of boats (12) capable of being lifted by application of upthrust at two spaced locations, the trailer comprising:
    a) a trailer frame (14) having towing means (18) for connection to a towing vehicle;
    b) first (20) and second (22) lifting means mounted on said frame to apply upthrust to lift and lower a boat thereon at spaced locations on the boat;
    c) said first lifting means (20) having means to define its position relative to said trailer frame for lifting purposes;
    d) said second lifting means (22) being movably mounted (26) on said trailer frame (14); and
    e) thrust means (28) connected between said trailer frame and said second lifting mean (22) to move the latter in the lifting direction (P2) and to apply a corresponding reaction thrust to said trailer frame; and
    f) said first (20) and second (22) lifting means each providing structure (46) to apply lifting thrust to the boat, to be lifted; and ground engageable wheel means (6) being provided structure (46) to apply lifting thrust to the boat, to be lifted; and ground engagable wheel means (6) being provided to support said trailer frame (14), said lifting thrust being applied to the boat to be lifted at laterally spaced positions thereon; said combination being further characterized by;

g) said first lifting means defining the said position thereof relative to said trailer frame (14) for lifting purposes providing a fixed position thereof relative to the trailer frame, said fixed position corresponding to the raised position of the boat to be lifted when said trailer frame is in its normal transport position (FIG. 1), and said fixed position corresponding to the lowered position of said article to be lifted when said trailer frame is raised (FIG. 2);

h) said thrust means (28) comprising a cam mechanism (32, 38) acting between said trailer frame (14) and said second lifting means (22);

i) an operating lever (32) for said cam mechanism (34, 38) for lifting the boat to be transported by a double lever action using both said lever (32) of said cam mechanism and said trailer frame (14) acting as a lever about said ground engageable wheel means (16);

j) said second lifting means comprising a lever (22) pivoted at its lower end to said trailer frame (14) and pivoted in the region of its upper end to the upper end of a camming lever (34), and end roller means (38) provided at a lower end of said camming lever and running on a track (90) provided on said trailer frame (14).

6. The trailer of claim 5 wherein said lever (22) and said camming lever (34), and said roller means (38) and said track (90) are provided at each side of said trailer frame (14).

7. The trailer of claim 6 wherein said operating lever (32) of said cam mechanism (34, 38) is fixed to said camming lever (34) and extends in the transport position (FIG. 1) of said trailer, forwardly from said camming lever and lengthwise of said trailer frame (14) to a location in the region of the forward end of the trailer frame, and said operating lever providing a hand lever for manual operation.

8. The trailer of claim 5 wherein said camming lever (34) is arranged to move over center as it raises said lift lever member (22) to a locked and stable lifted position (FIG. 1).

* * * * *